(12) United States Patent
Safamehr et al.

(10) Patent No.: US 9,887,642 B2
(45) Date of Patent: Feb. 6, 2018

(54) METHOD AND APPARATUS FOR ESTIMATED INDUCTANCE AND CURRENT FEEDBACK CONTROL OF A GRID-CONNECTED INVERTER WITH NONLINEAR INDUCTOR

(71) Applicants: Hossein Safamehr, Isfahan (IR); Tooraj Abbasian Najafabadi, Tehran (IR); Farzad Rajaei Salmasi, Tehran (IR)

(72) Inventors: Hossein Safamehr, Isfahan (IR); Tooraj Abbasian Najafabadi, Tehran (IR); Farzad Rajaei Salmasi, Tehran (IR)

( * ) Notice: Subject to any disclaimer, the term of this patent is extended or adjusted under 35 U.S.C. 154(b) by 0 days.

(21) Appl. No.: 15/586,239

(22) Filed: May 3, 2017

(65) Prior Publication Data

US 2017/0237364 A1    Aug. 17, 2017

Related U.S. Application Data

(60) Provisional application No. 62/330,862, filed on May 3, 2016.

(51) Int. Cl.
*H02M 1/12*    (2006.01)
*H02M 5/42*    (2006.01)
(Continued)

(52) U.S. Cl.
CPC .......... *H02M 7/53871* (2013.01); *H02M 1/08* (2013.01); *H02M 1/126* (2013.01);
(Continued)

(58) Field of Classification Search
CPC .......... H02M 5/42; H02M 5/297; H02M 1/32; H02M 1/12
See application file for complete search history.

(56) References Cited

U.S. PATENT DOCUMENTS 9,294,019 B2 *   3/2016   Liu ................... H02M 1/126
2011/0221420 A1   9/2011   Coccia et al.
(Continued)

FOREIGN PATENT DOCUMENTS

CN          104104255 A      10/2014

OTHER PUBLICATIONS

Guoqiao Shen et al., A New Feedback Method for PR Current Control of LCL-Filter-Based Grid-Connected Inverter, IEEE Transactions on Industrial Electronics, Jun. 2010, pp. 2033-2041, vol. 57, No. 6.

(Continued)

*Primary Examiner* — Timothy J Dole
*Assistant Examiner* — Ishrat Jamali
(74) *Attorney, Agent, or Firm* — NovoTechIP International PLLC

(57) ABSTRACT

An inverter output current passes from an inverter phase output, through a non-linear inverter side inductor, and into a line that connects through a grid side inductor to a grid phase. An inductance of the inverter side non-linear inductor is estimated, a current passing through the grid side inductor is estimated, and a current through the inverter side inductor is measured. An inverter feeding the inverter output is controlled using a weighted average of the estimated current through the grid side inductor and the inverter side inductor current measurement, applying a weighting using the estimated inductance.

18 Claims, 9 Drawing Sheets

(51) Int. Cl.
*H02M 7/5387* (2007.01)
*H02M 1/08* (2006.01)
*H02M 1/00* (2006.01)

(52) U.S. Cl.
CPC ............... *H02M 2001/0009* (2013.01); *H02M 2001/0025* (2013.01)

(56) References Cited

U.S. PATENT DOCUMENTS

| | | | |
|---|---|---|---|
| 2013/0094258 A1* | 4/2013 | Royak | H02M 1/32 363/89 |
| 2013/0208517 A1* | 8/2013 | Mashal | H02M 7/53875 363/40 |
| 2016/0094149 A1 | 3/2016 | Pahlevaninezhad | |
| 2016/0181938 A1* | 6/2016 | Alahuhtala | H02M 1/12 363/163 |

OTHER PUBLICATIONS

Tsai-Fu Wu et al., A Single-Phase Inverter System for PV Power Injection and Active Power Filtering With Nonlinear Inductor Consideration, IEEE Transactions on Industry Applications, Jul./Aug. 2005, pp. 1075-1083, vol. 41, No. 4.

\* cited by examiner

US 9,887,642 B2

METHOD AND APPARATUS FOR ESTIMATED INDUCTANCE AND CURRENT FEEDBACK CONTROL OF A GRID-CONNECTED INVERTER WITH NONLINEAR INDUCTOR

CROSS REFERENCE TO RELATED APPLICATION

This application claims the benefit of priority from pending U.S. Provisional Patent Application Ser. No. 62/330,862, filed May 3, 2016, and entitled "ENHANCED GRID-CONNECTED INVERTER WITH THE CAPABILITY OF NONLINEAR INDUCTOR IN THE OUTPUT FILTER HANDLING," which is incorporated by reference herein in its entirety.

TECHNICAL FIELD

The present application generally relates to a control of grid connected inverters and, more specifically, a control using an adaptive observer providing concurrent estimation of grid current and an inverter-side inductor.

BACKGROUND

In grid-connected DC-AC converters (hereinafter "inverters") an output filter can be used to improve power quality. The output filter can be an LCL filter. It has been known that hardware size and costs of the inductors on the LCL filter can possibly be reduced by operating the inductors in the nonlinear region of their B-H curve, as this enables smaller inductors. However, various technical problems have obstructed their use in a range of applications. One such technical problem can be stability in the LCL filters. Another technical problem, or set of technical problems, can result from inherent uncertainty of the non-linear inductor's instant inductance value. These may prevent or obstruct use of non-linear LCL filter inductors for some applications. One such application can be grid-connected inverters using, for feedback control, a measurement of current through one LCL inductor, and an estimate of current through another of the inductors. This can enable reduction in the number of current sensors and, hence, costs. However, the estimation of inductor current requires prior knowledge of the inductance values. Use of non-linear inductors, which have inherent variance in their inductance value, can remove the capability the estimation. This can necessitate additional current sensors, negating savings from reduced inductor size.

Accordingly, there is a need in the grid connected inverter field for a technical solution to reduce inductor costs without incurring other hardware costs or complexities.

SUMMARY

Disclosed methods can include transmitting an inverter output current from an inverter phase output, through a non-linear inverter side inductor, and through a grid side inductor to a grid phase, while concurrently estimating an inductance of the non-linear inverter side inductor and a current passing through the grid side inductor, in combination with measuring a current through the inverter side inductor, and generating a corresponding inverter side inductor current measurement; calculating a weighted average current, the weighted average current being a weighted average of the estimated current through the grid side inductor and the inverter side inductor current measurement, applying a weighting that is based, at least in part, on the estimated inductance of the inverter side inductor. Methods can further include generating a feedback signal, based at least in part on the weighted average current and, based at least in part on the feedback signal, controlling oscillation of an inverter feeding the inverter phase output.

Disclosed apparatuses can include a grid connected inverter with a nonlinear inductor in the output LCL filter, and a processor particularly configured to provide concurrent estimation of inductor value and grid current, and feedback using the estimation.

Benefits and advantages include technical solutions to the problem of employing non-linear inductors to reduce inductor size, without necessitating additional current sensors. Secondary benefits can include improvements in stability, and in efficiency by reducing core losses.

This Summary is provided to introduce a selection of concepts in a simplified form that are further described below in the Detailed Description. This Summary is not intended to identify key features or essential features of the claimed subject matter, nor is it intended to limit the scope of the claimed subject matter. Furthermore, the claimed subject matter is not limited to implementations that solve or are directed to solving technical problems or disadvantages noted in any part of this disclosure.

BRIEF DESCRIPTION OF THE DRAWINGS

The drawing figures depict one or more implementations in accord with the present disclosure, by way of example only, not by way of limitation. In the figures, like reference numerals refer to the same or similar elements.

FIG. 8B showing one example WAC feedback, and nonlinear inductor; and FIG. 8C showing one example WAC feedback with adaptive observer and nonlinear inductor.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
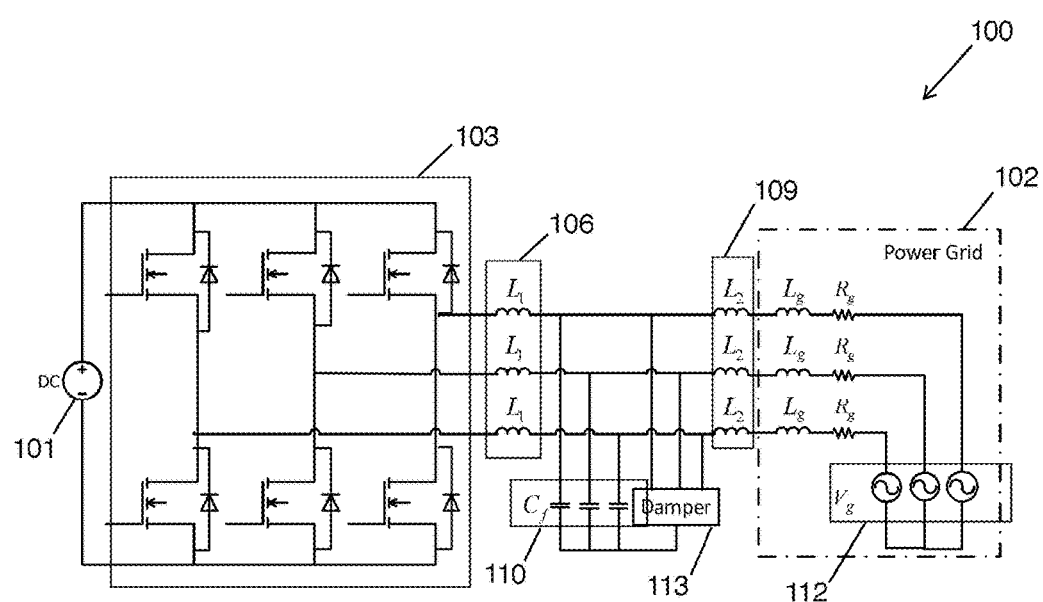
FIG. 1 shows a block diagram of relevant portions of one example three phase grid-connected inverter topology.

FIG. 1 shows a block diagram of relevant portions of one example three phase grid-connected inverter topology 100. The topology 100 can include a three-phase inverter block 103 connected to power grid 102 through an LCL-filter arrangement that includes, for each of the three phases, an inverter side inductor 106 connected in series (through a line that is visible in FIG. 1 but not separately numbered) with a grid side inductor 109, and includes a filter capacitor 109 (Cf) coupled between a ground reference (visible in FIG. 1 but not separately numbered) and the above-described connection between inductors 106 and 109. LCL-filter can be a resonant circuit and, for purposes of stability at its resonance frequency, can be damped by resistances represented collectively in FIG. 1 by the damper block 113.

As described above, known techniques may select and arrange the inverter side inductors 106 and grid side inductor 109 to operate in their linear regions. As also described, this can necessitate use of larger and higher cost inductors. Disclosed apparatuses and methods, in contrast, provide features that include, as will be described in greater detail, non-linear inductor implementation of inverter side inductors 106, together with feedback control for the three-phase grid-connected inverter topology 100 providing stable control, and utilizing adaptive estimation of inductance and inductor current—with the non-linear inductors—providing reduced sensor costs, along with other benefits.

Figure 2:
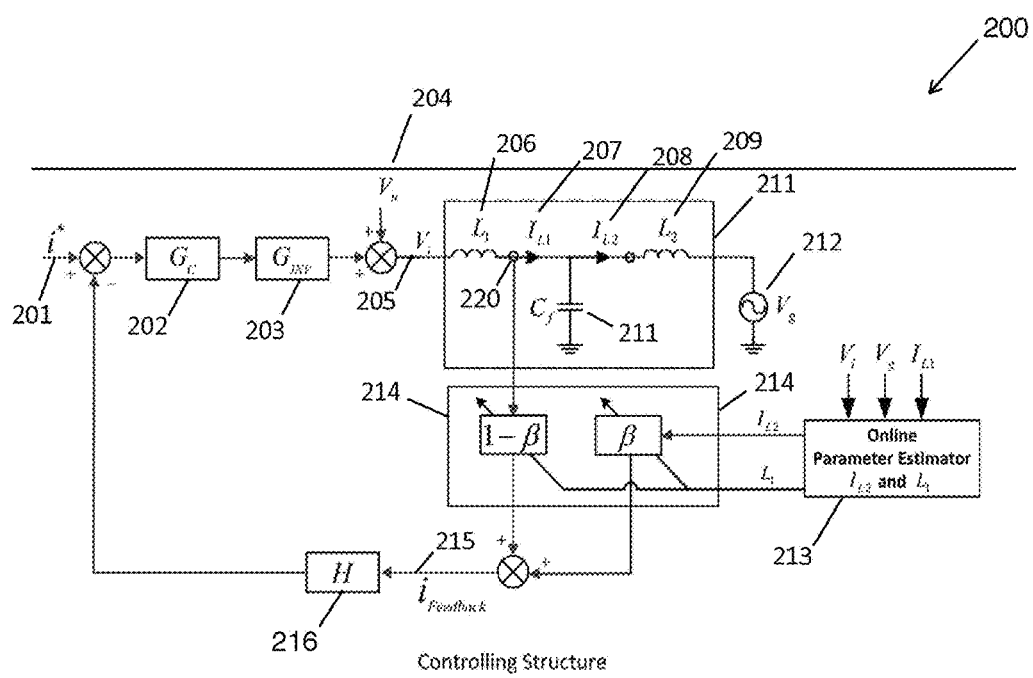
FIG. 2 shows one block diagram of one implementation of one example adaptive observer inverter controlling system, according to one or more aspects of this disclosure.

FIG. 2 shows a functional block diagram of one implementation of one example adaptive observer, non-linear LCL inductor feedback controlling system 200 according to one or more aspects of this disclosure. For brevity, description will alternatively recite "adaptive observer, non-linear LCL filter inductor, feedback controlling system" 200 in the abbreviated form "feedback control system" 200. Various implementations according to the FIG. 2 feedback control system 200 can be applied to various grid-connected inverter systems, including three phase grid-connected inverter systems having, for example, a topology as illustrated in FIG. 1. Accordingly, for purposes of illustration through examples, certain exemplary operations by the feedback control system 200 will be described in reference to FIG. 1. It will be understood that these are only examples, and are not intended to limit implementations or practices of systems such as illustrated by FIG. 2 to the FIG. 1 grid-connected inverter topology.

Referring to FIG. 2, the feedback control system 200 can utilize a reference current 201 feeding a proportional resonant current control 202 that is coupled to an inverter block 203 implemented, for example, with insulated-gate bipolar transistors (IGBTs). One example implementation can be the six IGBTs (visible but not separately numbered) forming the FIG. 1 inverter block 103. Each of the three phase outputs of the inverter block 203 can be scaled by a weighted grid voltage $V_n$, also labeled as "204," resulting in an output inverter voltage $V_i$ on the output line 205 (FIG. 2 shows only one representative example of the phase output lines 205). In an aspect, $V_n$ can be considered a disturbance and, accordingly, $V_n$ can consist of the grid voltage $V_g$ multiplied by a factor smaller than integer 1, for example, to increase a dynamic range of the controller system 200.

Each phase output line 205 can connect, via a corresponding phase structure of a specially configured, non-linear inductor LCL filter 211, to a grid voltage 212. Each phase of the specially configured, non-linear inductor LCL filter 211 can include an inverter-side, non-linear inductor 206 connected by a line (visible but not separately numbered) in series with a grid-side inductor 209 to a grid voltage 212. Further features and aspects of the inverter side non-linear inductors 206, as well as methods and processes of combinational feedback that include estimating their currents, will be described in greater detail later in this disclosure.

Referring to FIG. 2, each phase of the LCL filter 211 can include a filter capacitor 210 of value $C_f$ coupled between a ground (represented in FIG. 2 by a ground symbol) and the line connecting the inverter-side inductor 206 to the grid-side inductor 209. The LCL filter 211 can include damping resistors (not visible in FIG. 2), such as the FIG. 1 damper block 113.

Combination feedback structures of the FIG. 2 feedback control system 200, and aspects thereof, and including adaptive observer features will now be described. Referring to FIG. 2, an inverter inductor current sensor 220 senses a current through a representative one of the non-linear inverter inductors 206, and sends a corresponding $I_1$ measurement value to a "1−β" sub-block (visible but not separately numbered) of an adaptive combinational feedback weighting block 214. A non-linear adaptive observer block 213, which will be alternatively referenced as "online parameter estimator" block 213, can be configured to receive $V_i$, $V_g$ and $V_L$ and output in response, applying estimation algorithms described in greater detail in later paragraphs, an estimated instant inductance, labeled "$L_1$," of the non-linear inverter-side inductor 206 and an estimated instant current through the grid-side inductor 209, labeled "$I_{L2}$."

The non-linear adaptive observer block 213 can be configured to apply the following estimation Equations (1) to obtain the estimated instant inductance $L_1$ of the non-linear inverter-side inductor 206, which is represented in Equation (1) as $\hat{L}_1$, and the estimated grid-side inductor 209 current $I_{L2}$, which is represented in Equation (1) as $\hat{I}_g$:

$$\hat{I}_i = -\frac{R_1}{\hat{L}_1}\hat{I}_i - \frac{1}{\hat{L}_1}\hat{V}_c + \frac{1}{\hat{L}_1}V_i - K_i\tilde{I}_i$$

$$\hat{I}_g = -\frac{R_2}{L_2}\hat{I}_g + \frac{1}{L_2}\hat{V}_c - \frac{1}{L_2}V_g - K_g\tilde{I}_i$$

$$\hat{V}_c = \frac{1}{C_f}\hat{I}_i - \frac{1}{C_f}\hat{I}_g - K_c\tilde{I}_i$$

$$\hat{L}_1 = \gamma\left(\frac{V_i - \hat{V}_c - R_1\hat{I}_i - \hat{L}_1\hat{I}_i s}{m_s^2(s+\beta)}\right)\left(\frac{s\hat{I}_i}{s+\beta}\right)$$

Equations (1)

in which $R_1$, and $R_2$ are the resistance of $L_1$ (the non-linear inverter-side inductor 206) and $L_2$, (the grid-side inductor 209), respectively; $I_i$, is the measured current through the inverter side inductor 206; $L_2$ is the value of the grid end inductor 209; $C_f$ is the filter capacitor value, and $f_i=K_i\tilde{I}_i$, $f_g=K_g\tilde{I}_i$ and $f_c=K_c\tilde{I}_i$ represent observer correction functions. $V_i$ is the inverter voltage and can be readily detected, for example, by the status of inverter switches (not separately visible in FIG. 2) and dc-link voltage. $V_g$ is the grid voltage, and can be measured by a voltage sensor.

Referring to FIG. 2, the estimated instant inductance $\hat{L}_1$ of the non-linear inverter-side inductor 206 can be input to, and can vary, the "1−β" sub-block and the "β" sub-block of the adaptive combinational feedback weighting block 214.

The estimated instant current through the grid-side inductor 209, $I_{L2}$, can be input to the "β" sub-block of the adaptive combinational feedback weighting block 214. Resulting outputs from the adaptive combinational feedback weighting block 214 are the "1−β" weighted value of the measured inverter inductor current $I_{L1}$ and the "β" weighted value of the estimated current grid side inductor current $I_{L2}$, and these are summed to provide the weighted average, $I_{feedback}$, labeled 215. The weighted average $I_{feedback}$ 215 can be input to a feedback gain block 216, and the result subtracted from the reference current 201 for input to the proportional resonant current control 202, described above. The feedback gain block 216 can be, for example, a constant gain.

Referring to FIG. 2, the proportional resonant current control 202 can be configured to apply as its transfer function Equation (2):

$$G_c(s) = G_{\alpha\beta}(s) + G_{hc}(s) \quad \text{Equation (2).}$$

In an aspect the proportional resonant current control 202 can be configured to include, in its transfer function, a model of the reference signal and, assuming a sinusoidal reference signal, the transfer function should contain two poles on $j\omega$. The proportional resonant current control 202 can be configured to eliminate a steady state error at a desired frequency by applying an infinite gain at that frequency.

Equation (2) can be modelled as a sum of Equations (3) and (4), which will now be described. In an implementation, Equation (3) can model certain aspects of the proportional resonant current control 202, as the inverse transformation of the synchronous PI controller back to the stationary frame:

$$G_{\alpha\beta}(s) = \begin{bmatrix} K_p + \dfrac{K_i \omega_c s}{s^2 + 2\omega_c s + \omega^2} & 0 \\ 0 & K_p + \dfrac{2K_i \omega_c s}{s^2 + 2\omega_c s + \omega^2} \end{bmatrix} \quad \text{Equation (3)}$$

where $\omega_c$, is the cut-off frequency and can provide a more robust implementation.

Being a three phase proportional resonant controller, the non-diagonal terms of $G_{\alpha\beta}(s)$ can be zero, implying that the α and β axes are independent of each other and, can be treated as two single-phase systems.

By paralleling several resonant blocks tuned to resonate at different frequencies, the proportional resonant controller 202 can be configured as harmonic compensators. The transfer function of a harmonic compensator is given by Equation (4).

$$G_{hc}(s) = \sum_{h=3,5,7,\ldots} \dfrac{K_{ih}\omega_c s}{s^2 + 2\omega_c s + (h\omega)^2} \quad \text{Equation (4)}$$

The inventors provide, for purposes of assisting readers in understanding and practicing according to disclosed aspects, using example Equations (5) through (23), and without subscribing to or limiting any aspect of this disclosure to any particular scientific theory, what the inventors believe to be illustrative models forming Equation (1).

This can start with an LCL model with inductor resistances, as represented by Equation (5):

$$\begin{bmatrix} \dot{I}_i \\ \dot{I}_g \\ \dot{V}_c \end{bmatrix} = \begin{bmatrix} \dfrac{-R_1}{L_1} & 0 & \dfrac{-1}{L_1} \\ 0 & \dfrac{-R_2}{L_2} & \dfrac{1}{L_2} \\ \dfrac{1}{C_f} & \dfrac{-1}{C_f} & 0 \end{bmatrix} \begin{bmatrix} I_i \\ I_g \\ V_c \end{bmatrix} + \begin{bmatrix} \dfrac{1}{L_1} & 0 \\ 0 & \dfrac{-1}{L_2} \\ 0 & 0 \end{bmatrix} \begin{bmatrix} V_i \\ V_g \end{bmatrix} \quad \text{Equation (5)}$$

in which $R_1$ and $R_2$ are the resistance of $L_1$ and $L_2$, respectively. Note that $V_i$ is the inverter voltage and it is known according to the status of inverter switches and dc-link voltage. $V_g$ is the grid voltage and measured by voltage sensors.

Next, the system estimated equation can be formed according to the system model of Equation (6), as follows:

$$\dot{\hat{I}}_i = -\dfrac{R_1}{\hat{L}_1}\hat{I}_i - \dfrac{1}{\hat{L}_1}\hat{V}_c + \dfrac{1}{\hat{L}_1}V_i - f_i \quad \text{Equation (6)}$$

$$\dot{\hat{I}}_g = -\dfrac{R_2}{L_2}\hat{I}_g + \dfrac{1}{L_2}\hat{V}_c - \dfrac{1}{L_2}V_g - f_g$$

$$\dot{\hat{V}}_c = \dfrac{1}{C_f}\hat{I}_i - \dfrac{1}{C_f}\hat{I}_g - f_c$$

The estimated states or parameters are shown with the $\tilde{\ }$ sign.

Estimation errors of $$\tilde{I}_i = I_i - \hat{I}_i, \ \tilde{I}_g = I_g - \hat{I}_g, \ \tilde{V}_c = V_c - \hat{V}_c \ \text{and} \ \dfrac{1}{\tilde{L}_1} = \dfrac{1}{L_1} - \dfrac{1}{\hat{L}_1},$$

and subtracting Equation (6) from Equation (5), estimation error equations can be written as Equation (7):

$$\dot{\tilde{I}}_i = -\dfrac{R_1}{L_1}\tilde{I}_i - \dfrac{R_1}{\tilde{L}_1}\tilde{I}_i - \dfrac{1}{L_1}\tilde{V}_c - \dfrac{1}{\tilde{L}_1}\hat{V}_c + \dfrac{1}{\tilde{L}_1}V_i + f_i \quad \text{Equation (7)}$$

$$\dot{\tilde{I}}_g = -\dfrac{R_2}{L_2}\tilde{I}_g + \dfrac{1}{L_2}\tilde{V}_c + f_g$$

$$\dot{\tilde{V}}_c = \dfrac{1}{C_f}\tilde{I}_i - \dfrac{1}{C_f}\tilde{I}_g + f_c$$

where $f_i = K_i\tilde{I}_i$, $f_g = K_g\tilde{I}_i$ and $f_c = K_c\tilde{I}_i$ represent the observer correction functions.

With a strategy of reducing estimation error to zero, Equation (7) can be rewritten as Equation (8):

$$\begin{bmatrix} \dot{\tilde{I}}_i \\ \dot{\tilde{I}}_g \\ \dot{\tilde{V}}_c \end{bmatrix} = \begin{bmatrix} -\dfrac{R_1}{L_1} + K_i & 0 & -\dfrac{1}{L_1} \\ K_g & -\dfrac{R_2}{L_2} & \dfrac{1}{L_2} \\ \dfrac{1}{C_f} + K_c & -\dfrac{1}{C_f} & 0 \end{bmatrix} \quad \text{Equation (8)}$$

-continued $$\begin{bmatrix} \tilde{I}_i \\ \tilde{I}_g \\ \tilde{V}_c \end{bmatrix} + \begin{bmatrix} -R_1\hat{I}_i - \hat{V}_c + V_i \\ 0 \\ 0 \end{bmatrix} \begin{bmatrix} \dfrac{1}{\tilde{L}_1} \end{bmatrix}$$

These equations therefore have the form of $\dot{\tilde{X}}=A\tilde{X}+\omega^T\tilde{\theta}$, in which $\tilde{X}$ and $\tilde{\theta}$ include estimation errors, and A and Ω can be obtained. The following Equation (9) Lyapunov function can be used to obtain an adaption:

$$V=\tilde{X}^T\tilde{X}+\tilde{\theta}=\tilde{I}_i^2+\tilde{I}_g^2+\tilde{V}_c^2+\alpha\tilde{L}_1^2 \geq 0 \qquad \text{Equation (9)}$$

The time derivative of the Lyapunov function can be given by Equation (10):

$$\dot{V}=2\tilde{I}_i\dot{\tilde{I}}_i+2\tilde{I}_g\dot{\tilde{I}}_g+2\tilde{V}_c\dot{\tilde{V}}_c+2\alpha\tilde{L}_1\dot{\tilde{L}}_1 \qquad \text{Equation (10)}$$

Equation (10) can be negative definite to support Equation (9) as a Lyapunov function. This can be used to derive the adaption law. By substituting Equation (7) into Equation (10), $\dot{V}$ can be broken down in three parts as $\dot{V}_1$, $\dot{V}_2$ and $\dot{V}_3$, as represented by the following Equation (11):

$$\dot{V} = \left[-\tilde{I}_i \frac{1}{L_1}\tilde{V}_c + (\tilde{I}_i)(-R_1\hat{I}_i - \hat{V}_c + V_i)\left(\frac{1}{\tilde{L}_1}\right)\right] +$$
$$\tilde{I}_g K_g \tilde{I}_i + \tilde{I}_g \frac{\tilde{V}_c}{L_2} + \tilde{V}_c\left(\frac{1}{C_f} + K_c\right)\tilde{I}_i - \tilde{V}_c \frac{\tilde{I}_g}{C_f} - \frac{R_2}{L_2}\tilde{I}_g^2 +$$
$$\left[\left(-\frac{R_1}{L_1} + K_i\right)\tilde{I}_i^2\right] + \left[\alpha\tilde{L}_1\dot{\tilde{L}}_1\right] = \dot{V}_1 + \dot{V}_2 + \dot{V}_3$$

The first part of Equation (11) can be written in quadratic form as Equation (12).

$$\tilde{X}^T\Omega\tilde{X} = \left[\tilde{I}_i \tilde{I}_g \tilde{V}_c \frac{1}{\tilde{L}_1}\right] \begin{bmatrix} 0 & 0 & \dfrac{-1}{L_1} & -R_1\hat{I}_i - \hat{V}_c + V_i \\ K_g & -\dfrac{R_2}{L_2} & \dfrac{1}{L_2} & 0 \\ \dfrac{1}{C_j} + K_c & -\dfrac{1}{C_f} & 0 & 0 \\ 0 & 0 & 0 & 0 \end{bmatrix} \begin{bmatrix} \tilde{I}_i \\ \tilde{I}_g \\ \tilde{V}_c \\ \dfrac{1}{\tilde{L}_1} \end{bmatrix} \qquad (12)$$

Calculating the Eigenvalues of Ω, it can be seen that there exists $K_c$ and $K_g$ that causes Ω to be negative semi-definite and subsequently $\dot{V}_1 \leq 0$.

The second part of $\dot{V}$ can be written as Equation (13):

$$\dot{V}_2 = \left[\left(-\frac{R_1}{L_1} + K_i\right)\tilde{I}_i^2\right] \qquad \text{Equation (13)}$$

It can be assumed that an estimation error of a parameter cannot, at least in ordinary applications, be zero. It will therefore, be seen that $\dot{V}_2$ can have a desirably large negative value by selecting $K_i$ negative and as large as desired.

According to the results obtained, $\dot{V}$ is negative if $\dot{V}_3$ is positively bounded since a proper choosing of $K_i$, will result in an overall negative summation. Also, as will be understood, $\dot{V}_3$ can produce the inductor estimation portion of Equations (1).

More specifically, referring to Equation (11), the third part of $\dot{V}$ can be extracted and written as Equation (14):

$$\dot{V}_3 = [\alpha\tilde{L}_1\dot{\tilde{L}}_1] \qquad \text{Equation (14)}$$

where α has a positive value. The system and estimator model can be represented as Equations (15) and (16), respectively.

$$Z=\theta u \qquad \text{Equation (15)}$$

$$\hat{Z}=\hat{\theta}u \qquad \text{Equation (16)}$$

wherein θ is the unknown parameter, Z is the output and u is the input. Now, the error signal can be, written as Equation (17):

$$\varepsilon = \frac{Z - \hat{Z}}{m_s^2} \qquad \text{Equation (17)}$$

where $m_s^2$ is the normalizing factor and can be written as Equation (18):

$$m_s^2 = 1 + \Gamma u^2 \qquad \text{Equation (18)}$$

and Γ is a positive number.

By introducing a cost function which minimizes the error, $\hat{\theta}$ can be computed. One example cost function can be Equation (19).

$$J(\hat{\theta}) = \frac{\varepsilon^2 m_s^2}{2} = \frac{(Z - \hat{\theta}u)^2}{2m_s^2} \qquad \text{Equation (19)}$$

Using the gradient base method, $\dot{\hat{\theta}}$ can be given as Equation (20):

$$\dot{\hat{\theta}} = \gamma \varepsilon u \qquad \text{Equation (20)}$$

wherein γ is the adaption gain and has a positive value. By defining the estimation error as $err=\theta-\hat{\theta}$, the estimation error and the time derivative of the parameter estimation error may converge to zero in a short time.

One equation for $L_1$ can be Equation (21):

$$LsI_{L_1} = V_i - R_{L_1}I_{L_1} - V_c \qquad \text{Equation (21)}$$

Therefore, as can be set forth using Equation (22)

$$\theta = L_1 \qquad \text{Equation (22)}$$
$$Z = \frac{V_i - R_{L_1}I_{L_1} - V_c}{s + \beta}$$
$$u = \frac{sI_{L_1}}{s + \beta}$$

in which the input and output transfer functions are divided by $s+\beta$ to place the transfer function into a clearer form. It will be understood that this division can provide a degree of freedom for use in the designing procedure. Consequently, the estimated value of $L_1$ can be expressed as the following Equation (23):

$$\dot{\hat{L}}_1 = \gamma\left(\frac{V_i - \hat{V}_c - R_1\hat{I}_i - \hat{L}_1\hat{I}_i s}{m_s^2(s + \beta)}\right)\left(\frac{s\hat{I}_i}{s + \beta}\right) \to \dot{\hat{L}}_1 = \qquad (23)$$

$$\gamma \left( \frac{V_i - \hat{V}_c - R_1 \hat{I}_i - \hat{L}_1 \hat{I}_i s}{m_s^2(s+\beta)} \right) \left( \frac{s\hat{I}_i}{s+\beta} \right)$$

By initiating $\hat{L}_1$ with a limited value, to provide a bounded $\dot{V}_3$, and proper selection of adaptive gains, the negative definite condition of $\dot{V}$ will be satisfied.

Lastly, the adaptive observer equations implemented in the grid-connected inverter controller can be defined as set forth in Equation (1) above.

According to the inverter characteristics, the calculated LCL-filter parameters are given in TABLE I. It should be noted that the maximum attenuation can be obtained when inverter-side and grid-side inverters have equal values. However, since filter volume minimization is an important criterion, the desired attenuation was considered 20%, which results in a smaller grid-side inductor.

TABLE I

LCL filter parameters

| Symbol | Parameter | Value |
|---|---|---|
| $P_n$ | Nominal active power | 7 kW |
| $E_n$ | Line to line RMS voltage | 380 V |
| $f_g$ | Grid frequency | 50 Hz |
| $f_{sw}$ | Switching frequency | 15 kHz |
| $L_1$ | Inverter side inductor | 8.64 mH |
| $L_2$ | Grid side inductor | 0.123 mH |
| $C_f$ | Filter capacitor | 5.5 μF |
| $R_f$ | Damping resistor | 1.56 Ω |
| $\omega_{res}$ | Resonant frequency | 38720 $rad/sec$ |

Figure 3:
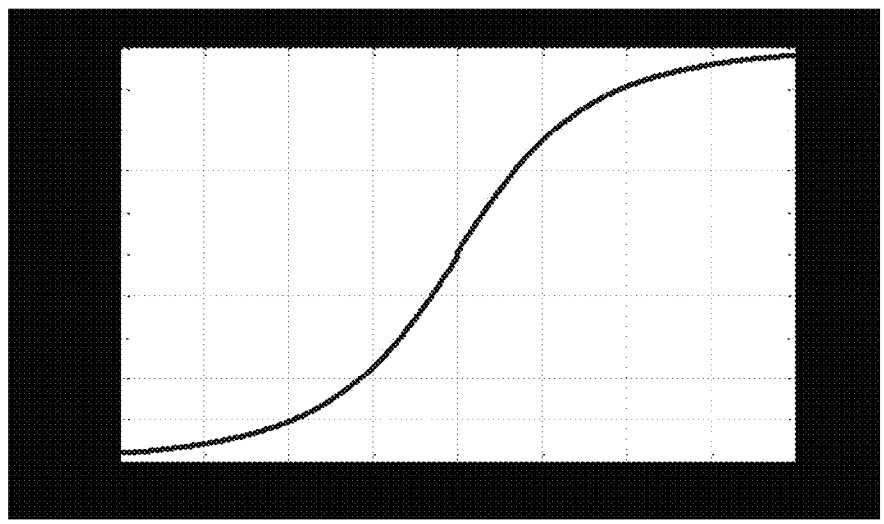
FIG. 3 shows a B-H curve of one example Kool Mµ core.

Powder cores are distributed air gap cores that can be suitable for high frequency applications, and compared to ferrite cores can exhibit higher saturation flux density, lower sensitivity to temperature changes and a softer saturation curve. FIG. 3 shows the characteristic curve of a powder core.

For purposes of illustration, inductor parameters were calculated assuming operation limited to the linear region. Software used for the calculation was Magnetics Co. The linearity assumption was then relaxed and the calculations were repeated. The calculated inductor size, and corresponding flux density for the linear and relaxed assumption are shown in TABLE II. For example, the maximum flux density of the linear inductor $L_1$ is 0.44 Tesla, compared to 0.86 Tesla in the nonlinear implementation. The nonlinear inductor size, in terms of inductance, is about one tenth the size of the linear implementation. The simulation also calculates, for this example, a 40% reduction in core loss being provided by the non-linear implementation. The calculation applied the following Equation (24) which is a core loss density equation of the KoolM μ material:

$$P_{loss} = V \times 120 B^{2.09} F^{1.46} \qquad \text{Equation (24)}$$

where V is the core volume, B is the core maximum flux density, and F is the operating frequency of the inductor core. As indicated by these simulation results, in implementations according to this disclosure inductor capacity can be used more efficiently. Secondary benefits can include reduction in inductor size, as well as reduction in core losses compared to linear region inductors in equivalent scale inverter output filters.

TABLE II

Linear and Non-Linear Inductor Parameters and Flux Density

| Parameters | $L_1$ (Linear) | $L_2$ | $L_1$ (Nonlinear) |
|---|---|---|---|
| Inductors | 8.64 mH | 0.123 mH | 8.64 mH |
| Part number | 77102 | 77440 | 77908 |
| Material | KoolM μ | KoolM μ | KoolM μ |
| Winding number of turns | 226 | 49 | 646 |
| Core cross section (cm$^2$) | 3.58 | 1.977 | 1.96 |
| Core magnetic path length (cm) | 24.3 | 11.13 | 22.1 |
| Number of stacks | 5 | 1 | 1 |
| Maximum flux density (Tesla) | 0.44 | 0.2 | 0.86 |

In this example only $L_1$ was implemented as a non-linear inductor, because it is significantly larger than $L_2$ due to the attenuation factor of the particular LCL filter used for this example. The maximum flux density of nonlinear designation is chosen on the basis of 1.3 times of the inverter nominal current to guarantee reliable operation under unknown grid conditions which may cause inductor saturation.

Figure 4:
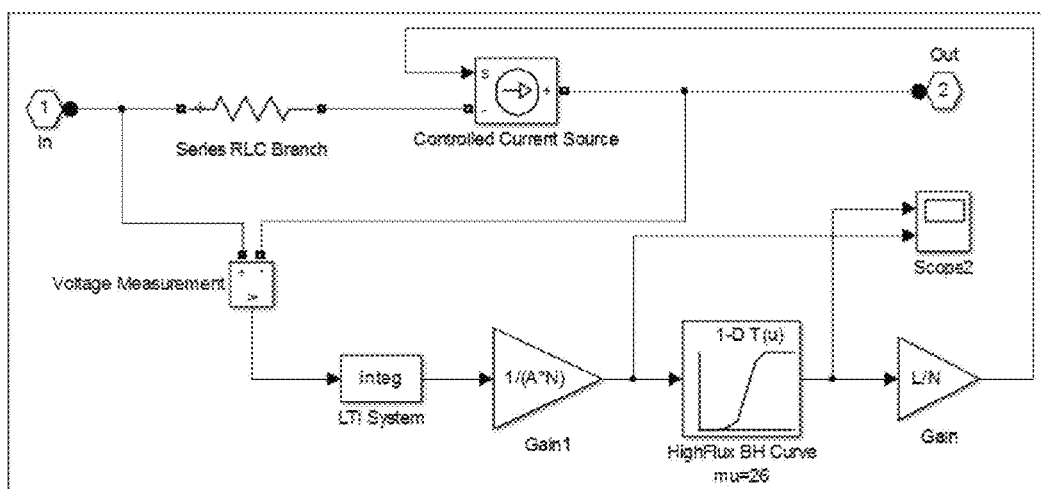
FIG. 4 graphically shows one simulation model of one example nonlinear inductor.

A time variant current-dependent model of the inductor using the real B-H curve of the selected core is used in the simulation tests. This implementation is realized under Simulink software by using the block diagram depicted in FIG. 4. The model consists of a dependent current source, appropriate gain blocks, an integrator to derive the flux from voltage and a lookup table function which defines the relationship between flux density and magnetizing force which is depicted in FIG. 3.

Figure 5A:
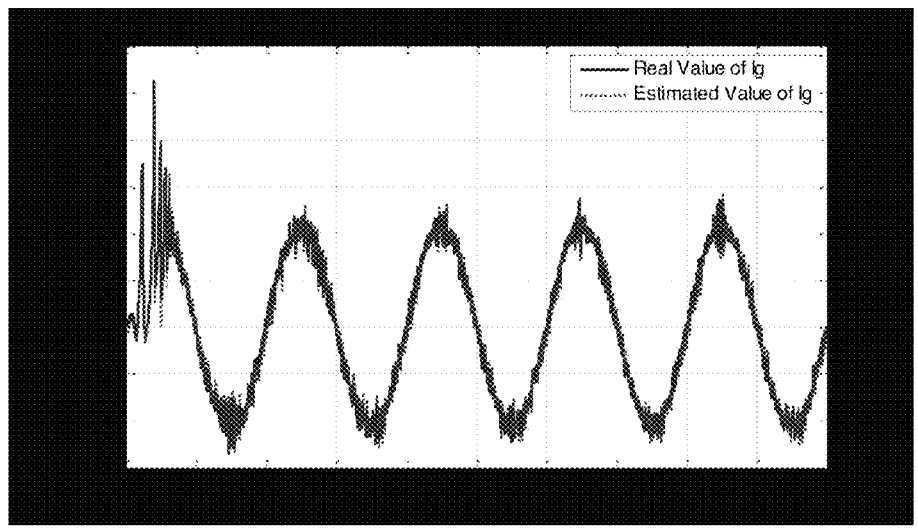
FIG. 5A shows a real value and estimated value of one example grid current.
Figure 5B:
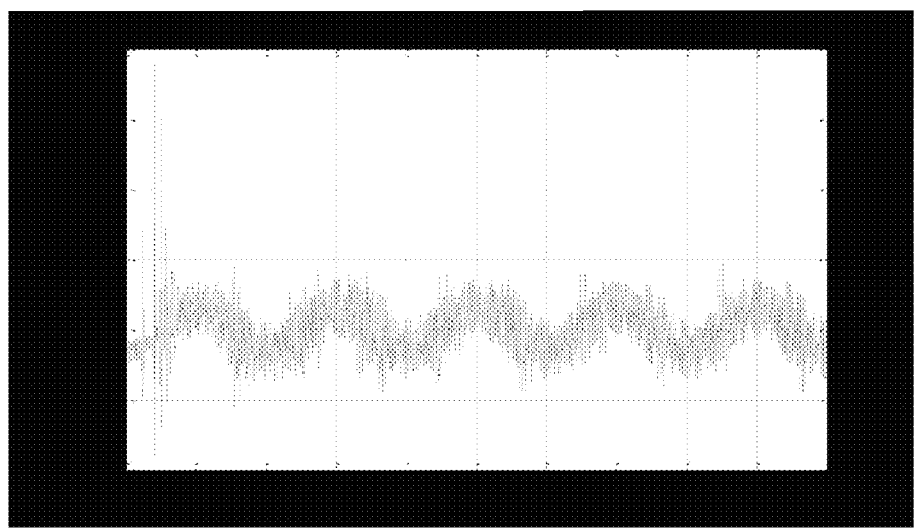
FIG. 5B illustrates an error of estimation.
Figures 6A, 6B:
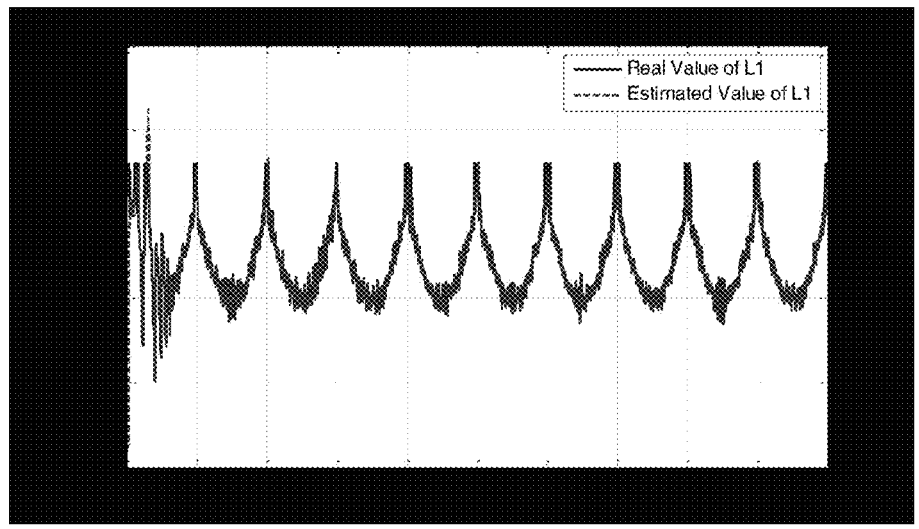
FIG. 6A shows a real value and estimated value of one example inverter inductor.
FIG. 6B shows an example error of estimation.

To verify control structure with concurrent adaptive estimation of grid current and inverter-side inductor, a three phase 7 kW grid-connected inverter with output LCL filter is modeled. As discussed in the previous section, nonlinear inductors are model by the described block diagram of FIG. 4. The observer gains are $K_i$=170, $K_c$=7.7*10$^{-8}$, $K_g$=4.7× 10$^6$, α=1, γ=50000 and Γ=1. FIG. 5A shows the real and estimated value of current through the grid side inductor, and FIG. 5B shows the corresponding error. FIG. 6A shows the real and estimated value of the inductance of the inverter side inductor, and FIG. 6B shows the corresponding error. The results appear to verify convergence of the estimated current and inductor value.

TABLE III shows control parameters of conventional feedback methods, including a conventional weighted average method, and an implementation including an adaptive observer providing concurrent estimation of inductance of the inverter side inductor and current through the grid side inductor in accordance with one or more aspects of the present disclosure. The method in accordance with one or more aspects of the present disclosure includes an adaptive observer such as the FIG. 2 non-linear adaptive observer block 213, and a nonlinear inductor in the LCL-filter, such as the FIG. 2 non-linear inverter-side inductor 206. It can be seen that the THD improved larger control gains were used in implementations according to disclosed aspects. The cutoff-frequency in this case is 15 rad/sec. Using smaller harmonic compensator gains is another advantage of adaptive observer estimation based inverter control according to disclosed aspects. Use of harmonic compensators in accordance with disclosed aspects can provide lower phase margin and, therefore, smaller harmonic compensator gains may provide better stability margin.

It will be appreciated by persons of ordinary skill, upon reading this disclosure, that contrary to conventional controlling structures, grid-voltage feed forward is not needed in methods according to this disclosure. This can provide, among other benefits, robustness against grid voltage distortions.

TABLE III

Controller parameters - nonlinear inductor and combinational feedback

| Parameters | Values-Nonlinear inductor with conventional feedback | Values-Nonlinear inductor with WAC feedback structure | Values-Nonlinear inductor with WAC feedback and adaptive observer |
|---|---|---|---|
| PI proportional gain | 10 | 20 | 20 |
| PI integral gain | 10 | 20 | 20 |
| Fundamental harmonic proportional gain | 15 | 145 | 165 |
| Fundamental harmonic resonant gain | 588 | 120 | 170 |
| 5th harmonic resonant gain | 260 | 35 | 14 |
| 7th harmonic resonant gain | 78 | 40 | 20 |
| Cutoff frequency | 5 ($^{rad}/_{sec}$) | 15 ($^{rad}/_{sec}$) | 15 ($^{rad}/_{sec}$) |
| THD | 12.61% | 5.41% | 3.42% |

TABLE IV depicts the individual harmonic current distortion of different structures according to IEEE-1547.

TABLE IV

Individual harmonic current distortion

| | Conventional Method & Nonlinear Ind. | WAC Feedback Method & Nonlinear Ind. | WAC Feedback with Adaptive Observer & Nonlinear Ind. |
|---|---|---|---|
| h < 11 | 9.92% | 2.26% | 1.31% |
| 11 ≤ h < 17 | 0.75% | 0.55% | 0.60% |
| 17 ≤ h < 23 | 0.87% | 0.72% | 0.66% |
| 23 ≤ h < 35 | 0.89% | 1.21% | 0.50% |
| 35 ≤ h | 0.18% | 0.67% | 0.35% |
| THD | 12.6% | 5.41% | 3.42% |

TABLE V shows the total harmonic distortion of different methods when the system sampling time is reduced to 5 μs. As can be seen, improvement can be provided by reducing sampling time.

TABLE V

Total harmonic distortion of different methods under 5 μs sampling time

| Method | Sampling Time | THD (%) |
|---|---|---|
| Conventional Method & Nonlinear Ind. | 5 μs | 3.1% |
| WAC Feedback Method & Nonlinear Ind. | 5 μs | 1.46% |
| WAC Feedback with Adaptive Observer & Nonlinear Ind. | 5 μs | 1.01% |

Figure 7:
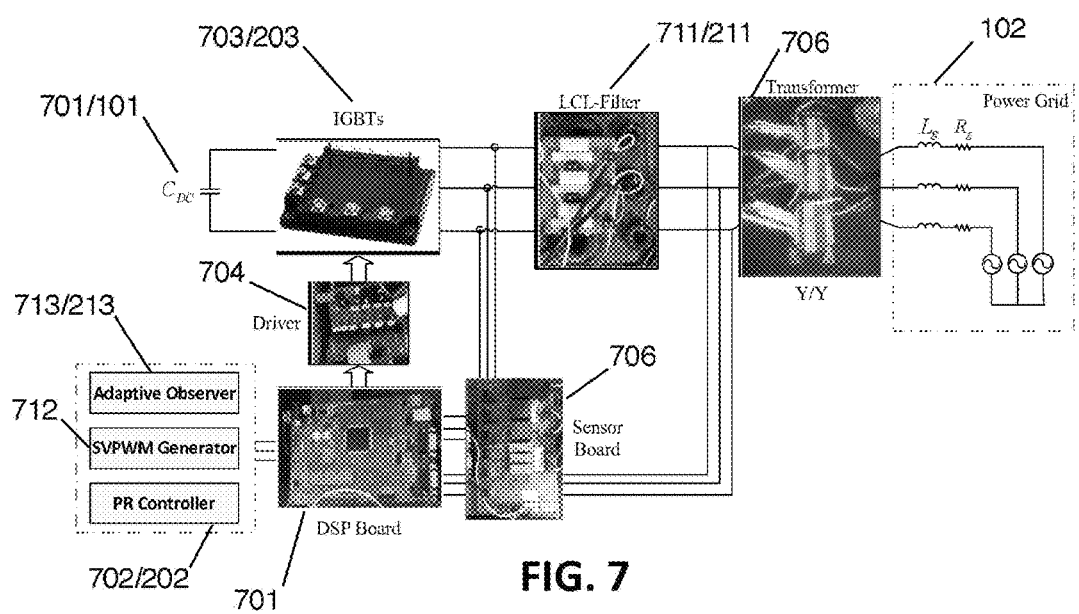
FIG. 7 shows a block diagram of portions of one constructed and tested implementation of one example adaptive observer inverter controlling system according to one or more aspects of the disclosure.

FIG. 7 shows a block diagram of portions of one constructed and tested implementation of one example adaptive observer inverter controlling system according to one or more aspects of the present disclosure. Some of the FIG. 7 blocks are labeled with two item numbers separated by a forward slash. In such instances the rightmost number is an item number of FIG. 1 or FIG. 2, to assist the reader associating FIG. 7 blocks of the above-described FIGS. 1 and 2.

Referring to FIG. 7, in the experimental setup, a digital signal processor (DSP) based digital controller 701 has been implemented using TMS230F28335 to control a three phase 7 kW inverter 703 (corresponding to the FIG. 2 inverter block 203) tied through an LCL filter 711 (corresponding to the FIG. 2 LCL filter 211) and transformer 706 with the grid 102. The DSP controller 701 implements an adaptive observer 713, configured according to disclosed aspects of the FIG. 2 non-linear adaptive observer block 213, and a PR controller 702, configured according to disclosed aspects of the FIG. 2 proportional resonant current control 202. The DSP controller 701 also implements a space vector pulse width modulation (SVPWM) unit 712 for controlling the inverter block 703. Control interface is provided by a driver 704. Voltage and current signals are measured using a sensor board 706 and the 12-bit resolution of internal analogue-to-digital converter in the DSP controller 702.

Experimental tests were carried out to verify performance at different operating conditions. The sampling time is set to 25 μs and the switching frequency is set to 15 kHz with 3 μs the dead-time. The inverter is connected to the grid by a three phase isolated Y/Y-connected transformer. The transformer leakage inductance is 1 mH per phase, which can represent a weak grid condition.

Figure 8A:
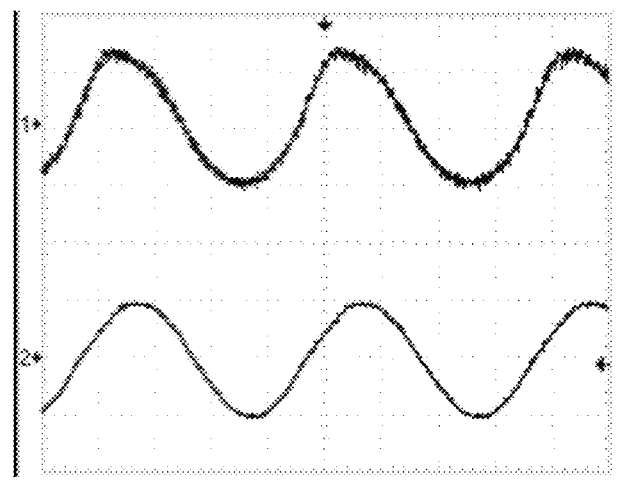
FIGS. 8A-8C show experimental results for one high loaded inverter, with FIG. 8A showing one example grid-side current feedback and nonlinear inductor.
Figure 8B:
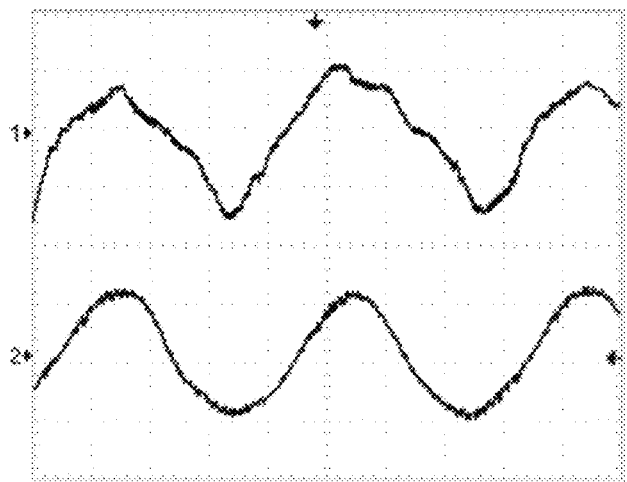
Figure 8C:
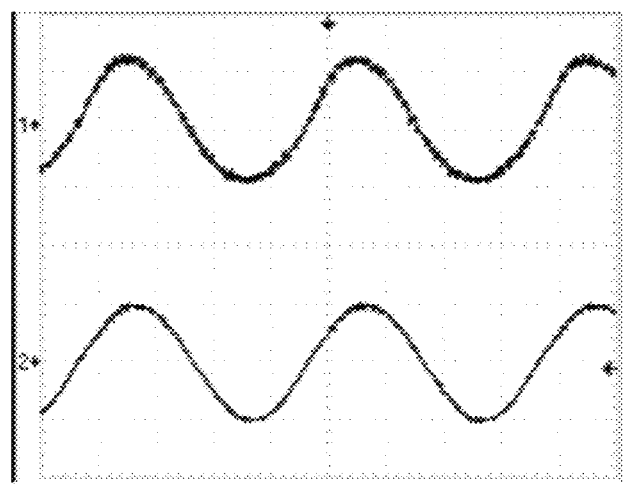

FIGS. 8A-8C show the experimental results under different controlling strategies. FIG. 8A depicts the waveform of injected current to the grid under proportional resonant control using measured grid current feedback. As can be seen, the THD is about 7.64%, which may not be acceptable to be injected into the grid according to some standards. FIG. 8B shows WAC feedback method results under the nonlinear behavior of LCL filter inductors. As can be seen from the simulation results, the injected current THD has reduced to 6.24% compared with the grid current feedback strategy. FIG. 8C depicts the experimental results of the tested implementation of WAC feedback with concurrent adaptive estimation of grid current and nonlinear inductors according to aspects of this disclosure. Adding the online adaptive observer for precise β assessment has improved THD to 3.64%.

Figure 9:
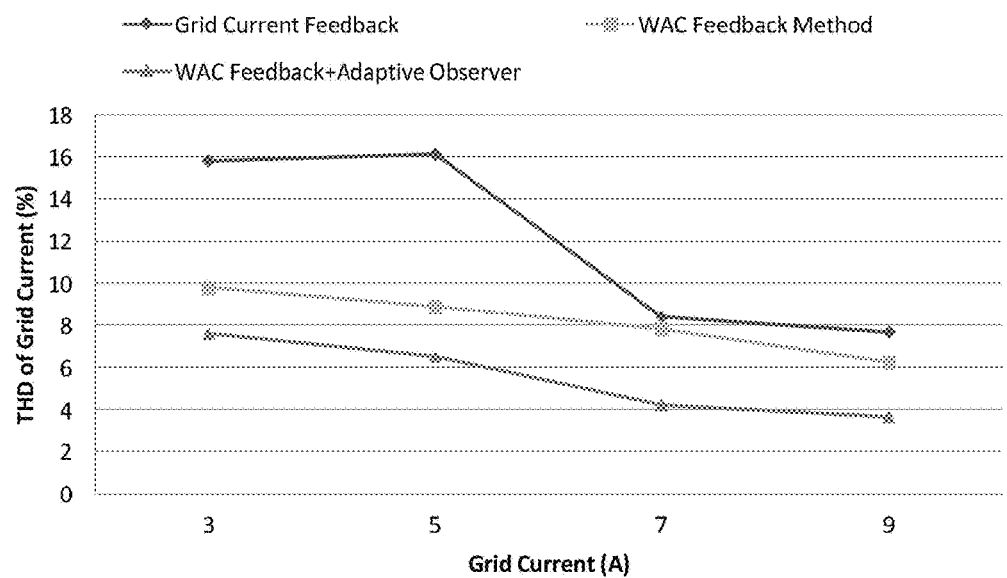
FIG. 9 shows experimental results of grid-current THD with different feedback methods in the presence of nonlinear inductor: (1) Grid current feedback, (2) combinational feedback, (3) combinational feedback and nonlinear inductor estimation

FIG. 9 shows the results of the grid current THD under different control strategies. Curve 1 is the system output under conventional control strategy with grid current feedback. Curve 2 depicts the results under the WAC feedback of inverter current and grid current and curve 3 is the results of using the WAC feedback strategy with an online adaptive observer in accordance with one or more aspects of this disclosure. From the current THD comparison results, it can be seen and appreciated that methods using online adaptive observer according to one or more disclosed aspects can provide practical and beneficial solutions to current control of the grid connected inverters, including utilizing nonlinear inductors in the output LCL filter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter.

What is claimed:

1. A method for controlling and filtering an inverter, comprising:
   transmitting an inverter output current from an inverter phase output, through an inverter side inductor, and through a grid side inductor to a grid phase, the inverter side inductor being in a non-linear state;
   measuring a current through the inverter side inductor, and generating a corresponding inverter side inductor current measurement;
   estimating an inductance of the inverter side inductor based, at least in part, on the measured current through the inverter side inductor;
   estimating a current passing through the grid side inductor;
   calculating a weighted average current, the weighted average current being a weighted average of the estimated current through the grid side inductor and the inverter side inductor current measurement, applying a weighting that is based, at least in part, on the estimated inductance of the inverter side inductor;
   generating a feedback signal, based at least in part on the weighted average current; and
   based at least in part on the feedback signal, controlling oscillation of an inverter feeding the inverter phase output.

2. The method of claim 1, wherein calculating the weighted average current includes weighting the estimated current through the grid side inductor by a first weight and weighting, the inverter side inductor current measurement by a second weight.

3. The method of claim 2, wherein
   the first weight can be represented as $(1-\beta)$,
   the second weight can be represented as $\beta$, and
   $\beta$ is based, at least in part, on the estimated inductance of the non-linear inverter side inductor.

4. The method of claim 1, wherein:
   transmitting the inverter output current from the inverter phase output includes passing the current from the inverter side inductor to the grid side inductor through a line, and
   a capacitor is connected between the line and a ground.

5. The method of claim 4, wherein estimating, an inductance of the inverter side inductor includes operations defined by the following:

$$\hat{L}_1 = \gamma \left( \frac{V_i - \hat{V}_C - R_1\hat{I}_i - \hat{L}_1\hat{I}_i s}{m_s^2(s+\beta)} \right) \left( \frac{s\hat{I}_i}{s+\beta} \right),$$

where
$\hat{L}_1$ is the estimated inductance of the inverter side inductor,
$\gamma$ is an adaption gain and has a positive value,
$\beta$ is a weight factor that is based, at least in part, on the estimated inductance of the non-linear inverter side inductor,
$m_s^2$ is a normalizing factor,
$R_1$ is the resistance of the inverter side inductor,
$\hat{I}_i$ is the current through the inverter side inductor, and
$V_i$ is the inverter voltage.

6. The method of claim 5, wherein $\beta$ is based, at least in part, on a sum of the estimated inductance of the inverter side inductor, the grid side inductor, and a grid inductance.

7. The method of claim 6, further comprising a determination of $\beta$ that includes performing operations defined by the following based weight estimating the current passing through the grid-side inductor includes application of the following:

$$L = L_1 L_2 + L_g,$$

$$\alpha = L_1/L, \text{ and}$$

$$\beta = 1 - \alpha.$$

8. The method of claim 7, wherein estimating the current passing through the grid side inductor is based, at least in part, on a combination of the inductance of the grid side inductor and a measurement of a grid voltage.

9. The method of claim 8, wherein estimating the current passing through the grid side inductor includes operations defined by the following:

$$\hat{I}_g = -\frac{R_2}{L_2}\hat{I}_g + \frac{1}{L_2}\hat{V}_C + \frac{1}{L_2}V_g - f_g,$$

where
$\hat{I}_g$ is the estimated current passing through the grid side inductor,
$R_2$ is the resistance of the grid side inductor,
$L_2$ is the inductance of the grid side inductor,
$C_f$ is the capacitor value of the capacitor connected between the line and ground,
$f_g = K_g \tilde{I}_i$ represents an observer correction function, and
$V_g$ is the grid voltage.

10. The method of claim 9, further comprising concurrently performing the estimating the current passing through the grid side inductor and the estimating the inductance of the inverter side inductor.

11. The method of claim 10, wherein, during concurrently performing the estimating the current passing through the grid side inductor and the estimating the inductance of the inverter side inductor, the maximum flux density through the inverter side inductor is two or more times the maximum flux density through the grid side inductor.

12. The method of claim 5, wherein estimating the current passing through the grid side inductor includes operations defined by the following:

$$\hat{I}_g = -\frac{R_2}{L_2}\hat{I}_g + \frac{1}{L_2}\hat{V}_C + \frac{1}{L_2}V_g - f_g,$$

where
$\hat{I}_g$ is the estimated current passing through the grid side inductor,
$R_2$ is the resistance of the grid side inductor,
$L_2$ is the inductance of the grid side inductor,
$C_f$ is the capacitor value of the capacitor connected between the line and ground,
$f_g = K_g \tilde{I}_i$ represents an observer correction function, and
$V_g$ is the grid voltage.

13. The method of claim 1, wherein controlling oscillation of the inverter feeding the inverter phase output, based at least in part on the feedback signal, includes
feeding the feedback signal and a reference signal into a proportional resonant current control,
controlling, based at least in part on an output of the proportional resonant current control, a state space vector pulse width modulation control of transistors of an inverter block.

14. The method of claim 1, wherein the inverter phase is a first inverter phase among three inverter phases, and the inverter side inductor is a first inverter side inductor among three inverter side inductors, each corresponding to one of the inverter phases.

15. An apparatus for controlling and filtering an inverter, comprising:
an inverter block, including a phase output;
an inductor-capacitor-inductor (LCL) filter coupling the phase output to a grid phase, the LCL filter including an inverter side inductor coupled by a conductor to a grid side inductor, and a filter capacitor coupling the conductor to a ground, the inverter side inductor being configured to operate, during operation of the apparatus, in a non-linear range;
a current sensor configured to measure a current through the inverter side inductor, and generate a corresponding inverter side inductor current measurement;
an adaptive observer, configured to estimate an inductance of the inverter side inductor based, at least in part, on the inverter side inductor current measurement, concurrent with estimating a current passing through the grid side inductor;
a feedback circuit, configured to calculate a weighted average current, the weighted average current being a weighted average of the estimated current through the grid side inductor and the inverter side inductor current measurement, applying a weighting that is based, at least in part, on the estimated inductance of the inverter side inductor, generate a feedback signal, based at least in part on the weighted average current; and
a proportional resonant controller configured to control oscillation of the inverter block, based at least in part on the feedback signal.

16. The apparatus of claim 15, wherein the feedback circuit is configured to calculate the weighted average current by weighting the estimated current through the grid side inductor by a first weight and weighting the inverter side inductor current measurement by a second weight.

17. The apparatus of claim 16, wherein
the first weight can be represented as $(1-\beta)$,
the second weight can be represented as $\beta$, and
$\beta$ is based, at least in part, on the estimated inductance of the non-linear inverter side inductor.

18. The apparatus of claim 17, wherein the adaptive observer is configured to estimate an inductance of the inverter side inductor by operations including operations defined by the following:

$$\hat{L}_1 = \gamma\left(\frac{V_i - \hat{V}_C - R_1\hat{I}_i - \hat{L}_1\hat{I}_i s}{m_s^2(s+\beta)}\right)\left(\frac{s\hat{I}_i}{s+\beta}\right),$$

where
$\hat{L}_1$ is the estimated inductance of the inverter side inductor,
$\gamma$ is an adaption gain and has a positive value,
$\beta$ is a weight factor that is based, at least in part, on the estimated inductance of the non-linear inverter side inductor,
$m_s^2$ is a normalizing factor,
$R_1$ is the resistance of the inverter side inductor,
$\hat{I}_i$ is the current through the inverter side inductor, and
$V_i$ is the inverter voltage.

* * * * *